(12) United States Patent
Lee et al.

(10) Patent No.: US 8,709,671 B2
(45) Date of Patent: Apr. 29, 2014

(54) FUEL CELL WITH AIR CHANNEL ACTUATOR

(75) Inventors: Dae-Young Lee, Seoul (KR); Seo Young Kim, Seoul (KR); Young Soo Chang, Seoul (KR); Young-Sheen Hwang, Seoul (KR); Hun-Sik Han, Seoul (KR); Suk-Won Cha, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1035 days.

(21) Appl. No.: 12/695,104

(22) Filed: Jan. 27, 2010

(65) Prior Publication Data

US 2010/0190082 A1    Jul. 29, 2010

(30) Foreign Application Priority Data

Jan. 28, 2009    (KR) ........................ 10-2009-0006714

(51) Int. Cl.
*H01M 2/38*    (2006.01)
*H01M 2/40*    (2006.01)
*H01M 8/24*    (2006.01)

(52) U.S. Cl.
USPC ............................ 429/455; 429/458; 429/459

(58) Field of Classification Search
USPC .......................................... 429/455, 458, 459
See application file for complete search history.

(56) References Cited

U.S. PATENT DOCUMENTS 6,503,650 B1 * 1/2003 Yasuo et al. .................. 429/459

FOREIGN PATENT DOCUMENTS

EP    1 288 498 A2 *    3/2003    .............. F04B 43/06

* cited by examiner

*Primary Examiner* — Patrick Ryan
*Assistant Examiner* — Julian Anthony
(74) *Attorney, Agent, or Firm* — Vierra Magen Marcus LLP

(57) ABSTRACT

Disclosed is a fuel cell including, a stack having fuel channels through which fuel flows and air channels through which air flows, the fuel channels and air channels being located at both sides of a reaction film, an actuator disposed to be involved in the air channels, the actuator allowing external air of the stack to affect the air channels, and a skirt extending from the stack with communicating with the air channels.

12 Claims, 4 Drawing Sheets

FUEL CELL WITH AIR CHANNEL ACTUATOR

RELATED APPLICATION

This application claims priority from Korean Patent Application No. 10-2009-0006714, filed on Jan. 28, 2009, which is herein expressly incorporated by reference in its entirety.

BACKGROUND OF THE INVENTION

1. Field of the Invention

The present invention relates to a fuel cell in which external air is involved in an air flow within air channels installed to face fuel channels of a reaction film.

2. Background of the Invention

In general, a fuel cell is a power generating device for generating a direct current (DC) by a direct conversion of chemical energy of fuel into electrical energy. A fuel cell technology is an eco-friendly technology, having several features of high efficiency, high output, non-pollution, non-noise and modulation, by which electricity (power) and heat can be simultaneously obtained from various energy sources, such as natural gas, propane, naphtha, methanol and the like.

A micro-fuel cell, as one of various types of fuel cells includes a stack as a generation module, a fuel cartridge for driving the stack, a pump for supplying fuel/air, and a balance of plant (BOP) such as a control board for voltage conversion and various control operations. For the commercialization of the micro-fuel cell, the BOP components occupying a considerable large proportion of the volume of the fuel cell are required to be light in weight and small in size.

Also, the stack must be provided with a sufficient amount of air under appropriately maintained temperature and humidity conditions in order to achieve a smooth reaction. To this end, a blower or a compressor is employed. For satisfying the temperature and humidity conditions, a preheater, a humidifier and the like are further included in the BOP.

However, the employment of the BOP may improve the output in the stack; however, a net output of the fuel cell may rather be decreased in consideration of power consumed due to the BOP.

SUMMARY OF THE INVENTION

Therefore, an object of the present invention is to provide a fuel cell having a different type of an air supplying mechanism from the related art.

Another object of the present invention is to convert temperature and humidity of supplied air into an appropriate level for a reaction with fuel within a stack.

Another object of the present invention is to implement the configuration for the conversion with less power consumption and in a more simplified form than that in the related art.

To achieve these and other advantages and in accordance with the purpose of the present invention, as embodied and broadly described herein, there is provided a fuel cell including a stack, an actuator and a skirt. The stack may include a reaction film, and fuel channels through which fuel flows and air channels through which air flows are disposed at both sides of the reaction film. The actuator may allow outside air of the stack to affect or actuate inside air of the air channels. The skirt may extend from the stack with communicating with the air channels.

In one aspect of the present invention, the fuel channels may extend within the stack and communicate with a fuel supplier.

In another aspect of the present invention, the actuator may actuate the outside air to alternately flow in a direction toward the air channels and an opposite direction thereto. To this end, the actuator may be implemented as a vibration film or a piston-cylinder assembly, each of which reciprocates.

In another aspect of the present invention, the skirt may be a hollow body having a through hole. A hygroscopic portion may further be formed on an inner circumferential surface of the skirt for absorbing moisture.

The hygroscopic portion may be formed by coating a desiccant on the inner circumferential surface.

In another aspect of the present invention, a hydraulic diameter of the skirt may be the same as that of the air channel. The air channels may communicate with an exterior through both end portions disposed in one direction of the stack, and the skirt may be configured as a pair mounted at the both end portions.

In accordance with another embodiment of the present invention, a fuel cell may include a plurality of reaction films including electrodes and electrolyte attached to the electrodes, a plurality of separation plates disposed between the reaction films, and allowing fuel channels for a fuel flow and air channels for an air flow to be located at both sides of each reaction film, respectively, an actuator actuates outside air to actuate inside air of the air channels, and skirts extending from the separation plates with communicating with the air channels.

In one aspect of the present invention, the skirts may be disposed on the plurality of separation plates, respectively, or have one channel communicating with air channels of two or more of the separation plates.

The fuel cell according to the present invention having such configuration is implemented such that the flow of air, which chemically reacts with fuel flowing through the fuel channels with interposing a reaction film therebetween can be affected by the actuator, which allows a smooth air supply, resulting in improvement of an output voltage of the fuel cell, compared to the related art.

Also, a skirt extending toward the actuator with communicating with the air channels is employed, so as to increase temperature and humidity of air introduced into the air channels. Accordingly, reaction energy for the chemical reaction within the stack can be reduced and ion flow through the reaction film become smooth. Consequently, the reaction within the stack can be more activated, resulting in further increase in the output voltage of the fuel cell.

In addition, a preheater, a humidifier and the like for adjusting temperature and humidity are not needed due to the existence of the skirt, which is advantageous in reducing the volume of a fuel cell system. Also, the skirt does not separately consume power.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
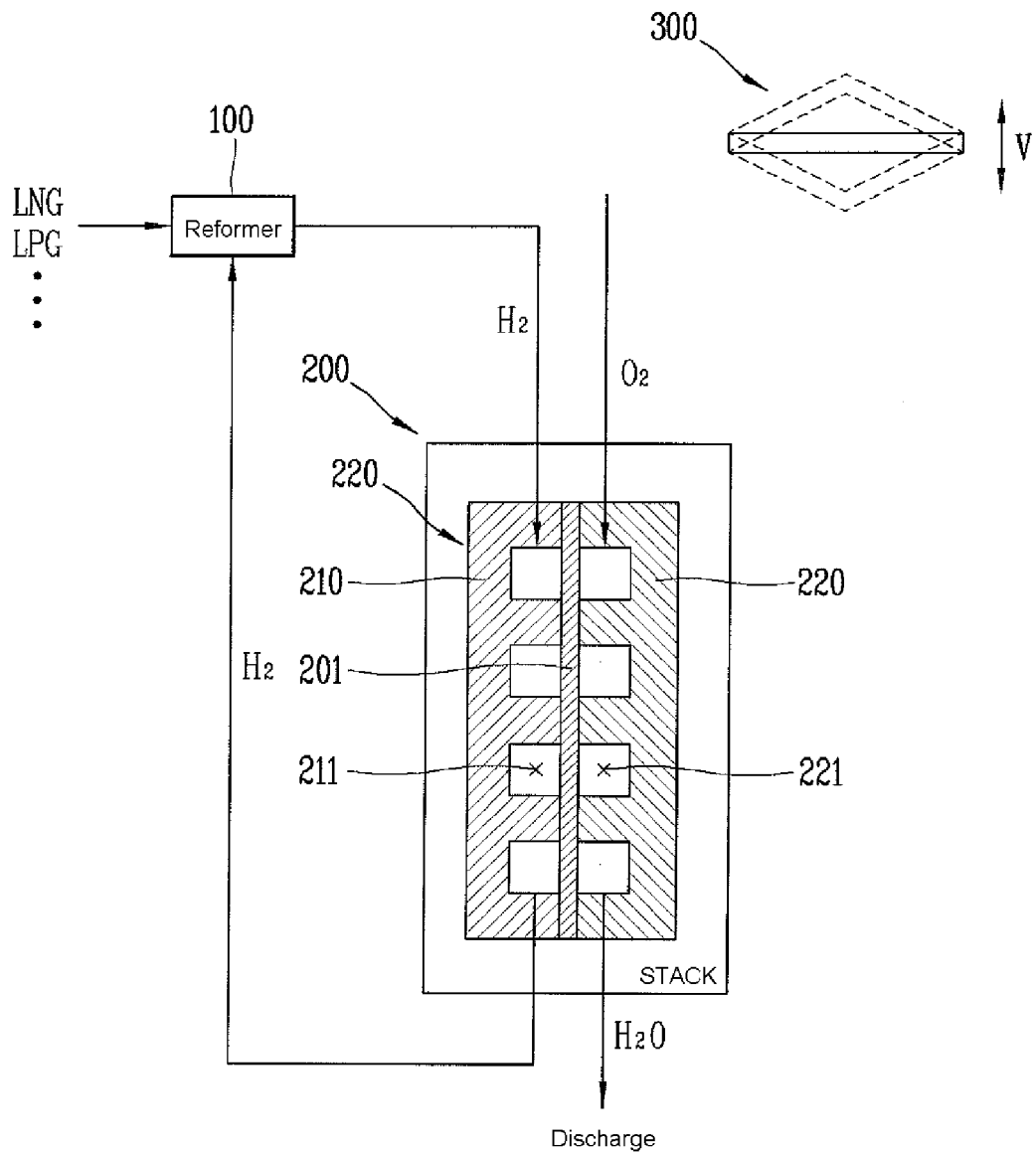
FIG. 1 is an overview showing a fuel cell in accordance with one embodiment of the present invention.

Description will now be given in detail of a fuel cell in accordance with the preferred embodiments of the present invention, with reference to the accompanying drawings. The like and similar components even in different embodiments are given of the like and similar reference numerals in the specification of the present invention, and the description of the embodiments will be understood by the first description.

FIG. 1 is an overview showing a fuel cell in accordance with one embodiment of the present invention. As shown in FIG. 1, a fuel cell may include a stack 200 in which an electric-chemical reaction is generated, in addition to a balance of plant (BOP) such as a reformer 100 and an actuator 300.

The reformer 100 is a device for reforming hydrogen from a hydrocarbon based fuel. Alternatively, the reformer 100 may be replaced with a hydrogen tank or a fuel cartridge containing reformed hydrogen.

The hydrogen supplied by the reformer 100 is delivered to fuel channels 211 of the stack 200. The fuel channels 211 may be formed, for example, by recessing one surface of an anode separation plate 210. The fuel channels 211 may partially be defined by a reaction film 201. The reaction film 201 may be configured in the form of electrode-attached electrolyte. Hydrogen ion H+ of the fuel channels 211 may be moved to air channels 221 via the reaction film 201. The air channels 221 may be located at a surface facing the corresponding fuel channels 211 of the reaction film 201, and configured, for example, by recessing a cathode separation plate 220.

With such configuration, the hydrogen within the fuel channels 211 chemically reacts with oxygen within the air channels 221 through the reaction film 201, thereby generating electrical energy. Water, in addition to the electrical energy, may also be generated within the air channels 221 as a reaction by-product.

For the smooth chemical reaction, supplied air should actively flow. Also, a temperature of the air should be as high as capable of supplying energy, which is higher than a minimum energy level needed for the reaction, and humidity thereof higher than a particular level should be maintained. For the latter, water molecules are needed in order for the hydrogen ion to flow through the reaction film 201, so the reaction film 201 should be in a wet state.

In order to allow a smooth air flow within the air channels 221, an actuator 300 may be provided for the air channels 221. The actuator 300 may render air flow both in a direction toward the air channels 221 and in an opposite direction thereto, namely, make an oscillating flow (i.e., in directions V). Accordingly, the air within the air channels 221 makes an oscillatory flow within the air channels 221, without rarely flowing out of the air channels 221, under the influence of external air, which makes an oscillatory flow. This becomes a factor of stably maintaining the temperature and humidity conditions of the internal air of the stack 200. In addition, the oscillating flow facilitates the water as the reaction by-product to be removed from the stack 200.

The actuator 300 may be implemented, for example, as a vibration film which is repeatedly vibrated in opposite directions, a piston-cylinder assembly which also reciprocates, or the like.

Figure 2:
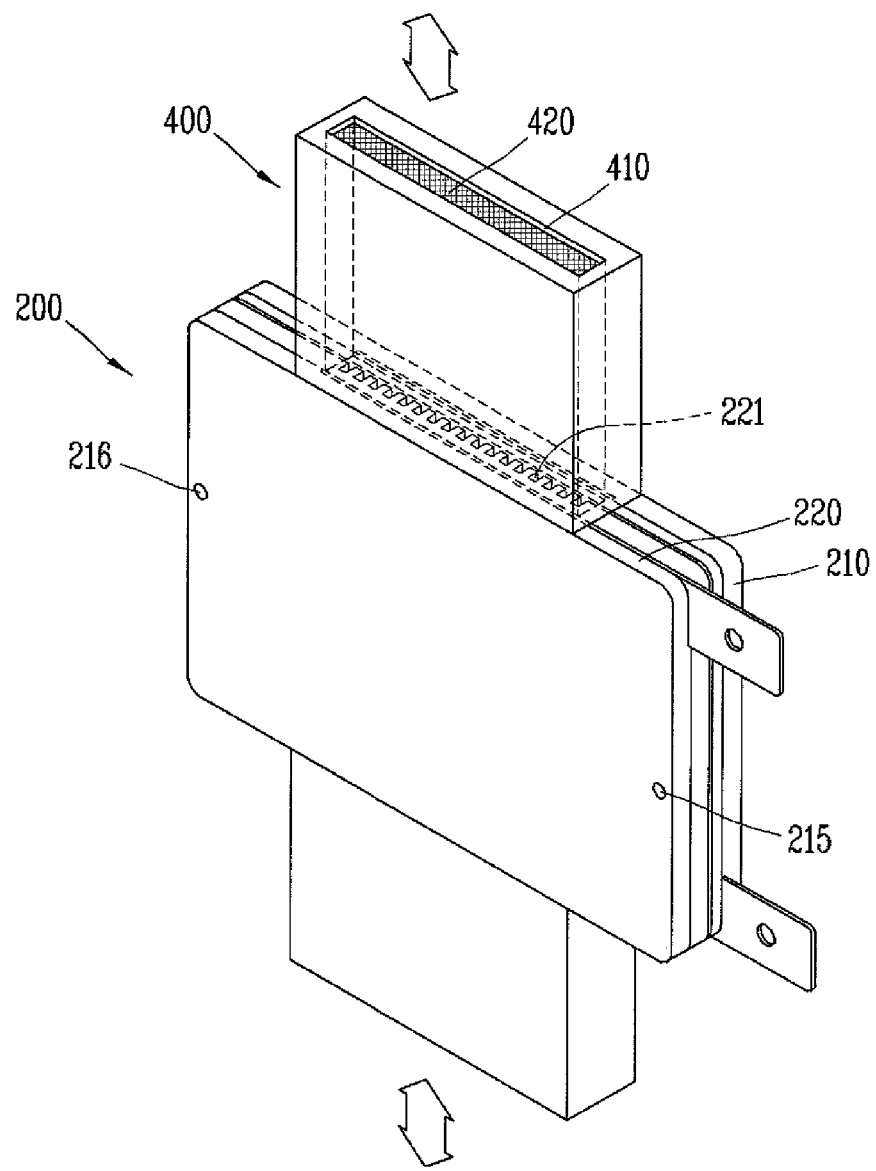
FIG. 2 is a perspective view showing a coupled state between a stack and a skirt in accordance with one embodiment of the present invention.

FIG. 2 is a perspective view showing a coupled state between the stack 200 and a skirt 400 in accordance with one embodiment of the present invention.

As shown in FIG. 2, the air channels 221 may be exposed to a side surface of the cathode separation plate 220, of the anode separation plate 210 and the cathode separation plate 220 implementing the stack 200. The air channels 221 may be formed to communicate with external air, with being wrapped up by the skirt 400.

The skirt 400 may be implemented as a hollow body having a penetration portion 410, which is open to extend in an approximately one direction within the skirt 400. The skirt 400 may extend toward the actuator 300 (see FIG. 1) and the penetration portion 410 may communicate with the air channels 221. Here, because the reaction film 201 and the like are not disposed at the penetration portion 410, a reaction does not occur within the skirt 400. However, the existence of the skirt 400 may cause temperature and humidity of air introduced toward the stack 200 to be increased as high as being appropriate for the reaction within the stack 200.

Preferably, a hydraulic diameter of the skirt 400 may be approximately the same as that of the air channel 221 because internal air of the air channels 221 may flow into the skirt 200 or vice versa. Also, in correspondence to a distance of the oscillating flow by the actuator 300, a length of the skirt 400 may be set to be approximately the same as the distance.

As the air channels 221 are configured to communicate with both ends of the stack 200, the skirt 400 may be formed at each of the both ends of the stack 200.

A hygroscopic portion 420 may be formed at an inner circumferential surface which defines the penetration portion 410 of the skirt 400. The hygroscopic portion 420 may be formed, for example, by coating a desiccant on the inner circumferential surface.

The relatively high temperature and high humidity air, which flows up to the skirt 400 within the stack 200, comes in contact with relatively low temperature and low humidity air, which comes close to the skirt 400, by the influence of the oscillating flow caused by the actuator 300. Vapor condensed by the contact is absorbed by the hygroscopic portion 420. Accordingly, the air flowing from the inside of the skirt 400 to the outside thereof partially flows out with leaving energy or moisture thereof. Also, the air introduced into the skirt 400 flows toward the stack 200 with being reinforced with energy and humidity due to vapor. Consequently, the effect of increasing the temperature and humidity of the air introduced toward the stack 200 by the skirt 400 may be further enhanced.

The fuel channels 211 (see FIG. 1) are formed within the anode separation plate 210, so it may be located within the stack 200. In order to communicate with a fuel supplier such as the reformer 100, the stack 200 may be provided with a fuel inlet 215 and a fuel outlet 216.

The drawing shows the stack 200 only having a pair of separation plates 210 and 220; however, a fuel cell may be implemented in the form of plural pairs of separation plates being aligned in parallel. For the latter, the skirt may be independently installed at each pair of separation plates, or be formed so as to have one penetration portion for two or more pairs of separation plates.

Figure 3A:
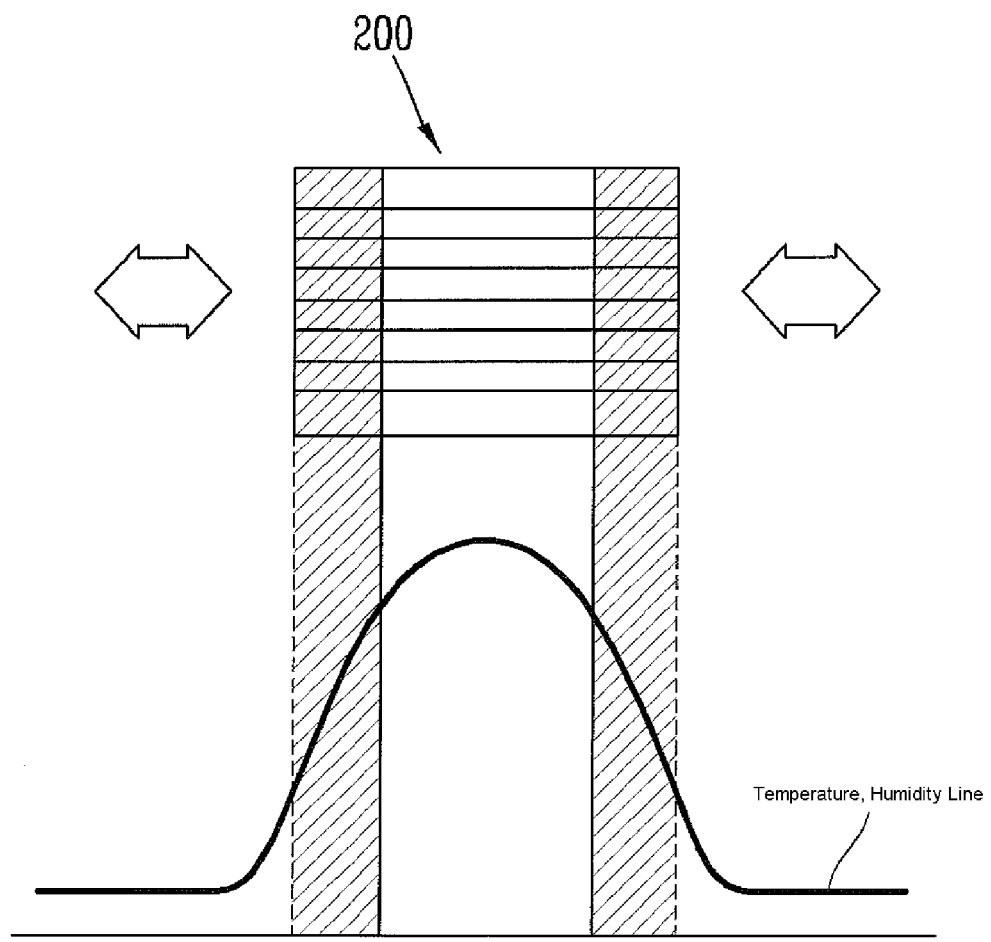
FIG. 3A is an overview showing a temperature state and a humidity state within the stack before being coupled with the skirts.
Figure 3B:
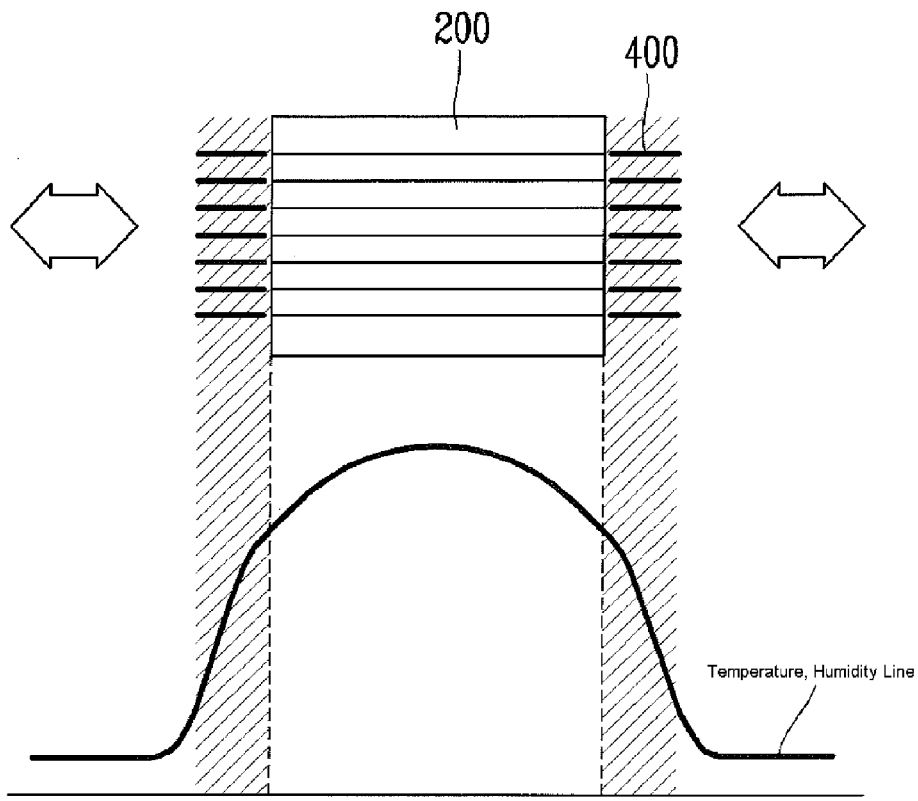
FIG. 3B is an overview showing a temperature state and a humidity state within the stack after being coupled with the skirts.

FIG. 3A is an overview showing a temperature state and a humidity state within the stack 200 before being coupled with the skirt 400, and FIG. 3B is an overview showing a temperature state and a humidity state within the stack 200 after being coupled with the skirt 400.

As shown in FIG. 3A, it can be noticed, with respect to the stack 200 which is exposed to the oscillating flow caused by the actuator 300, that the internal temperature and humidity of the stack 200 is remarkably decreased at regions adjacent to both end portions after reaching the peak at the middle region. Under the temperature and humidity conditions at the adjacent regions, on account of the aforesaid, a smooth reaction between hydrogen and oxygen cannot be easily expected.

As shown in FIG. 3B, it can be noticed that the remarkable decrease of the temperature and humidity is not found at the peripheral regions of the stack 200, in spite of the oscillating flow due to the actuator 300. Such result is derived from the existence of the skirts 400 as mentioned above. As the temperature and humidity higher than a particular level is maintained at the regions adjacent to the end portions of the stack 200 as well as at the central region within the stack 200, the reaction can be evenly generated over the entire region of the stack 200, which results in improvement of electricity generation efficiency of the fuel cell.

Figure 4:
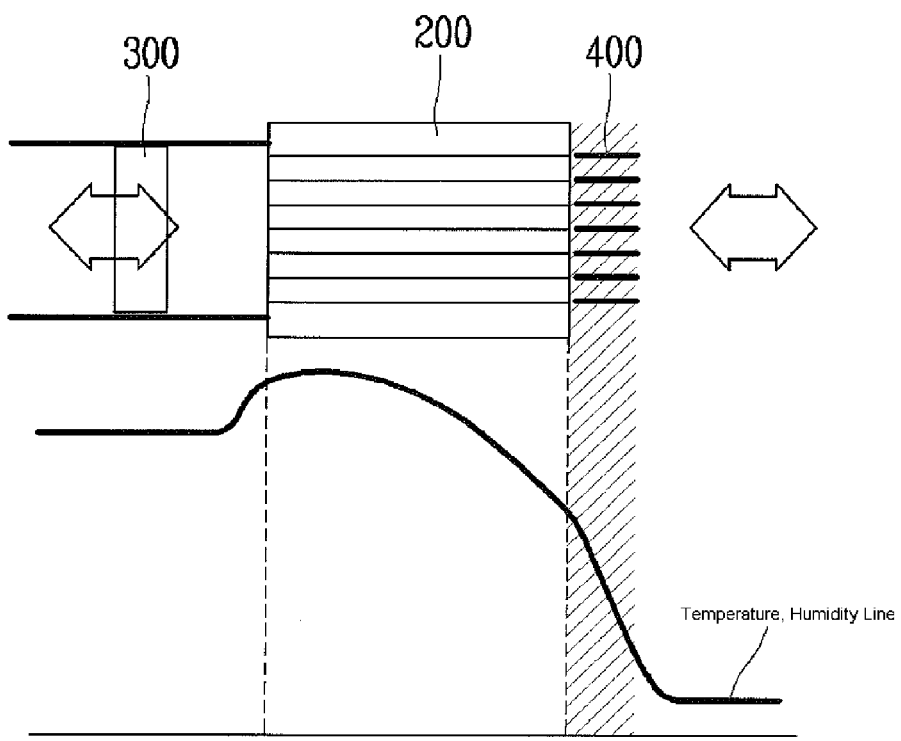
FIG. 4 is an overview showing that a skirt is coupled only to one end portion of the stack.

FIG. 4 is an overview showing that a skirt 400 is coupled only to one end portion of the stack 200.

As shown in FIG. 4, the skirt 400 may be located at one end portion of the stack 200, and another end portion of the stack 200 is blocked by the actuator 300.

In this case, heat or vapor may not be diffused at the blocked side by the actuator 300. Hence, even if the skirt 400 is not disposed at the side where the actuator 300 is located, the temperature and humidity higher than a particular level can be maintained at the regions adjacent to the actuator 300.

The foregoing embodiments and advantages for the configuration and the operation method of the fuel cell are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A fuel cell comprising:
    a stack having a reaction film, fuel channels for a fuel flow and air channels for an air flow, the fuel channels and the air channels being located at both sides of the reaction film, respectively;
    an actuator being positioned within a skirt extending from the stack which communicates with the air channels for rendering an oscillating air flow of air outside the stack and within the skirt which air flow oscillates between a direction toward the air channels and in an opposite direction, the oscillating air flow being received by the air channels and causing inside air of the air channels to oscillate in direction in accordance with the oscillating air flow; and
    the skirt is configured to pre-heat and humidify the air outside the stack and within the skirt which is introduced into the air channels by the oscillating inside air of the air channels.

2. The fuel cell of claim 1, wherein the fuel channels extend within the stack and communicate with a fuel supplier.

3. The fuel cell of claim 1, wherein the actuator comprises a vibration film or a piston-cylinder assembly, each reciprocating.

4. The fuel cell of claim 1, wherein the skirt is a hollow body with a through hole.

5. The fuel cell of claim 4, further comprising a hygroscopic portion formed on an inner circumferential surface of the skirt for absorbing moisture.

6. The fuel cell of claim 5, wherein the hygroscopic portion is formed by coating a desiccant on the inner circumferential surface.

7. The fuel cell of claim 4, wherein a hydraulic diameter of the skirt is the same as that of the air channel.

8. The fuel cell of claim 1, wherein the air channels communicate with an exterior through both end portions disposed in one direction of the stack, and the skirt is configured as a pair mounted at the both end portions.

9. A fuel cell comprising:
    a plurality of reaction films including electrodes and electrolyte attached to the electrodes;
    a plurality of separation plates disposed between the reaction films, and allowing fuel channels for a fuel flow and air channels for an air flow to be located at both sides of each reaction film, respectively;
    one or more skirts extending from the separation plates which communicate with the air channels;
    an actuator being positioned within at least one of the one or more skirts for rendering an oscillating air flow of air outside the stack and within the skirt which air flow oscillates between a direction toward the air channels and in an opposite direction, the oscillating air flow being received by the air channels and causing inside air of the air channels to oscillate in direction in accordance with the oscillating air flow; and
    the one or more skirts which communicate with the air channels forming a space with higher temperature and humidity than a space outside the skirt and stack due to the oscillating air flow of the air outside the stack and within the skirt and the inside air of the air channels.

10. The fuel cell of claim 9, wherein each of the one or more skirts is a hollow body having a through hole.

11. The fuel cell of claim 10, further comprising a hygroscopic portion formed on an inner circumferential surface of each skirt for absorbing moisture.

12. The fuel cell of claim 9, wherein the one or more skirts are disposed on the plurality of separation plates, respectively, or each has one channel communicating with air channels of two or more of the separation plates.

* * * * *